United States Patent
Sasaki

(10) Patent No.: US 10,871,191 B2
(45) Date of Patent: Dec. 22, 2020

(54) ROLLING BEARING AND BEARING STRUCTURE INCLUDING SAME

(71) Applicant: NTN CORPORATION, Osaka (JP)

(72) Inventor: Katsuaki Sasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/490,362

(22) PCT Filed: Mar. 1, 2018

(86) PCT No.: PCT/JP2018/007756
§ 371 (c)(1),
(2) Date: Aug. 30, 2019

(87) PCT Pub. No.: WO2018/159755
PCT Pub. Date: Sep. 7, 2018

(65) Prior Publication Data
US 2020/0011378 A1    Jan. 9, 2020

(30) Foreign Application Priority Data
Mar. 3, 2017 (JP) .................. 2017-040255

(51) Int. Cl.
*F16C 19/06* (2006.01)
*F16C 33/38* (2006.01)
(Continued)

(52) U.S. Cl.
CPC .......... *F16C 33/3887* (2013.01); *F16C 19/06* (2013.01); *F16C 33/3806* (2013.01); *F16C 33/414* (2013.01)

(58) Field of Classification Search
CPC .... F16C 19/06; F16C 33/385; F16C 33/3806; F16C 33/3887; F16C 33/414; F16C 2240/80; F16C 33/3843; F16C 33/6681
(Continued)

(56) References Cited

U.S. PATENT DOCUMENTS 1,822,053 A * 9/1931 Marles .................. F16C 33/543
384/575
3,510,185 A * 5/1970 McKee ............... F16C 33/3843
384/497
(Continued)

FOREIGN PATENT DOCUMENTS

DE  1 764 464  4/1958
DE  239 026    9/1986
(Continued)

OTHER PUBLICATIONS

International Search Report dated May 22, 2018 in International (PCT) Application No. PCT/JP2018/007756.
(Continued)

*Primary Examiner* — Marcus Charles
(74) *Attorney, Agent, or Firm* — Wenderoth, Lind & Ponack, L.L.P.

(57) ABSTRACT

A rolling bearing including a cage is provided. The cage includes, on its outer peripheral surface, a plurality of ridges protruding radially outwardly, and circumferentially spaced apart from each other. The ridges extend in the axial direction or in an oblique direction or directions relative to the circumferential direction. The ridges are capable of coming into contact with the inner peripheral surface of the outer ring through lubricating oil.

8 Claims, 4 Drawing Sheets

(51) Int. Cl.
*F16C 33/66* (2006.01)
*F16C 33/41* (2006.01)

(58) Field of Classification Search
USPC ........ 384/470, 497, 527–528, 534, 903, 523
See application file for complete search history.

(56) References Cited

U.S. PATENT DOCUMENTS

| | | | | |
|---|---|---|---|---|
| 3,597,031 | A * | 8/1971 | Bill | B01D 35/02 384/470 |
| 4,226,484 | A * | 10/1980 | Glassow | F16C 33/3806 384/470 |
| 4,324,444 | A * | 4/1982 | Buczynski | F16C 33/3806 384/526 |
| 5,039,231 | A * | 8/1991 | Kispert | F16C 19/361 384/572 |
| 5,918,986 | A * | 7/1999 | Matsui | A61C 1/05 384/470 |
| 6,113,278 | A * | 9/2000 | Ohira | F16C 33/44 384/527 |
| 6,196,724 | B1 | 3/2001 | Murai et al. | |
| 6,481,898 | B1 * | 11/2002 | Yakura | F16C 33/303 384/516 |
| 6,955,476 | B1 | 10/2005 | Murai | |
| 8,118,493 | B2 * | 2/2012 | Tsujimoto | F16C 19/364 384/571 |
| 8,616,776 | B2 * | 12/2013 | Nakamura | F16C 33/4635 384/470 |
| 10,012,266 | B1 * | 7/2018 | Moratz | F16C 33/583 |
| 10,138,939 | B2 * | 11/2018 | Kamamoto | F16C 33/1085 |
| 2009/0103844 | A1 * | 4/2009 | Kobayashi | F16C 33/6625 384/462 |
| 2009/0252594 | A1 * | 10/2009 | Itoh | F01D 25/16 415/110 |
| 2012/0033907 | A1 * | 2/2012 | Huhnke | F16C 33/6681 384/473 |
| 2016/0319868 | A1 * | 11/2016 | Kirchhoff | F16C 33/6696 |

FOREIGN PATENT DOCUMENTS

| | | | | |
|---|---|---|---|---|
| JP | 02-072219 | | 3/1990 | |
| JP | 03-172612 | | 7/1991 | |
| JP | 08074862 | A * | 3/1996 | ......... F16C 33/3831 |
| JP | 11-344035 | | 12/1999 | |
| JP | 2007-120766 | | 5/2007 | |
| JP | 2008-175329 | | 7/2008 | |
| JP | 2010-001971 | | 1/2010 | |
| SU | 1027445 | A * | 7/1983 | ............. F16C 19/06 |

OTHER PUBLICATIONS

International Preliminary Report on Patentability dated Sep. 3, 2019 in International (PCT) Application No. PCT/JP2018/007756.

\* cited by examiner

ROLLING BEARING AND BEARING STRUCTURE INCLUDING SAME

TECHNICAL FIELD

The present invention relates to a rolling bearing and a bearing structure including the rolling bearing.

BACKGROUND ART

Generally, a motor small in size is required in electric vehicles, hybrid vehicles, etc., and thus a rolling baring bearing of which the vibration is low, and of which the durability is high is required so as to durably support a shaft required to rotate at a higher speed.

In such a conventional rolling bearing, the cage comes into contact with the outer ring in the presence of lubricating oil such as turbine oil when the bearing rotates, and the cage has, at several portions of its outer peripheral surface, inclined surface portions inclined relative to the rotation direction of the cage so that an oil film is easily formed between the contact surfaces of the cage and the outer ring (see the below-identified Patent Document 1).

Also, in order to prevent wear of the guided surface on the outer periphery of the cage when the rolling bearing rotates in the high-speed rotation range in which the dmn value is more than 600,000, it is known to reinforce the resin forming the cage with fiber (see the below-identified Patent Document 2).

PRIOR ART DOCUMENTS

Patent Documents

Patent document 1: Japanese Unexamined Patent Application Publication No. H02-72219
Patent document 2: Japanese Unexamined Patent Application Publication No. 2010-1971

SUMMARY OF THE INVENTION

Problems to be Solved by the Invention

However, for the rolling bearing of Patent Document 1, the inclined surface portions at several portions of the outer periphery of the cage are incapable of collecting a sufficiently large amount of lubricating oil into limited spaces. Thus, while an oil film functioning as a buffer is formed by the pressure of the lubricating oil collected into the narrow spaces between the cage and the outer ring, its function as a buffer is not sufficient.

Not only while the rolling bearing (of Patent Document 1) is rotating at a high speed, but especially while rotating at a speed somewhat lower than "high speed", it is difficult to form a sufficient oil film between the cage and the outer ring.

It is an object of the present invention to overcome the above problem, specifically, to provide a rolling bearing capable of rotating at a high speed in which, in a relatively wide rotation range, a lubricating oil film is easily formed in a stable manner between the cage and the outer ring, and once formed, never breaks so that the rolling bearing is capable of stably rotating with low torque for a long time while reducing wear and vibration of the cage and the outer ring.

Means for Solving the Problems

In order to achieve the above object, the present invention provides a rolling bearing comprising: an outer ring: an inner ring for retaining a rotary shaft: rolling elements between the outer ring and the inner ring; and a cage rotatably retaining the rolling elements, and configured to be guided by the outer ring, wherein the cage has an endless annular shape, when the cage is seen in an axial direction, wherein the cage includes, on an outer peripheral surface of the cage, a plurality of ridges protruding outwardly in a radial direction, and spaced apart from each other in a circumferential direction, wherein each of the ridges extends either in the axial direction or in an oblique direction or directions relative to the circumferential direction, and wherein the ridges are capable of coming into contact with an inner peripheral surface of the outer ring through lubricating oil.

As described above, the rolling bearing of the present invention includes, on the outer peripheral surface of the cage, a plurality of circumferentially spaced apart ridges protruding radially outwardly, and extending in the axial direction or in an oblique direction directions relative to the circumferential direction.

Therefore, when the cage rotates relative to the outer ring with the ridges kept in contact with the inner peripheral surface of the outer ring through lubricating oil, lubricating oil is collected near the front surface (in the rotation direction of the cage) of each ridge, and is wedged into a wedge-shaped gap defined between the ridge and the inner peripheral surface of the outer ring. At this time, the pressure of the lubricating oil in the wedge-shaped gap, which is a fluid, increases toward the apex of the ridge, thereby generating a so-called "wedge film effect."

The thus-pressurized lubricating oil in the wedge-shaped gaps between the ridges and the outer ring's inner peripheral surface acts to widen the gaps, thereby keeping the ridges out of contact with the inner peripheral surface of the outer ring. By disposing a large number of such ridges at relatively short intervals, the "wedge film effect" by lubricating oil simultaneously occurs along substantially the entire circumference of the inner peripheral surface of the outer ring. As a result thereof, even when the rolling bearing is used in a relatively wide rotation range, it is possible to form an lubricating oil film effectively generating the "wedge film effect" near the apexes of the ridges.

Also, since a lubricating oil film completely separating the cage and the outer ring is formed between the cage and the outer ring, it is possible to generate, between the cage and the outer ring, fluid lubrication condition in which the cage and the outer ring slide relative to each other while kept out of direct contact with each other.

Therefore, it is possible to always prevent seizure due to oil film breakage, and reduce the wear of the cage due to the friction between the outer ring and the cage, and the vibration of the cage due to its direct contact with the outer ring. As a result thereof, it is possible to stably rotate the rolling bearing with low torque for a long period of time.

In order to effectively generate the "wedge film effect", 2. each of the ridges preferably includes a semi-columnar apex portion. This enables a wedge-shaped gap drastically narrowing at a short interval to be defined between opposed circular arc-shaped surfaces, specifically, between the inner peripheral surface of the outer ring and the apex portion of each ridge located near the inner peripheral surface of the outer ring.

Also, in order to prevent seizure even if the portions of the ridges located near the inner peripheral surface of the outer ring severely come in to sliding contact with the inner peripheral surface of the outer ring in an unexpected manner, the cage per se is preferably made of brass having excellent slidability relative to, e.g., the outer ring made of steel.

The rolling bearing having such properties can be used in a bearing structure in which the rolling bearing supports a rotary shaft which rotates at a high speed in which the dmn value (dm is the average value of the bearing's inner and outer diameters (pitch circle diameter), and n is the number of revolutions of the bearing) is 600,000 or more. Such a rotary shaft which rotates at a high speed comprises, e.g., a rotary shaft of a transmission, and also a different rolling bearing may be used in the bearing structure.

Effects of the Invention

Since the rolling bearing of the present invention includes, on the outer peripheral surface of the cage, a plurality of radially outwardly protruding ridges circumferentially spaced apart from each other, and capable of coming into contact with the inner peripheral surface of the outer ring through lubricating oil, a lubricating oil film is easily formed in a stable manner between the cage and the outer ring irrespective of the rotation speed of the bearing, and never breaks once formed, thereby preventing seizure. Therefore, it is possible to stably rotate the rolling bearing with low torque for a long period of time while reducing the wear and vibration of the cage and the outer ring.

DETAILED DESCRIPTION OF THE INVENTION

Figure 1:
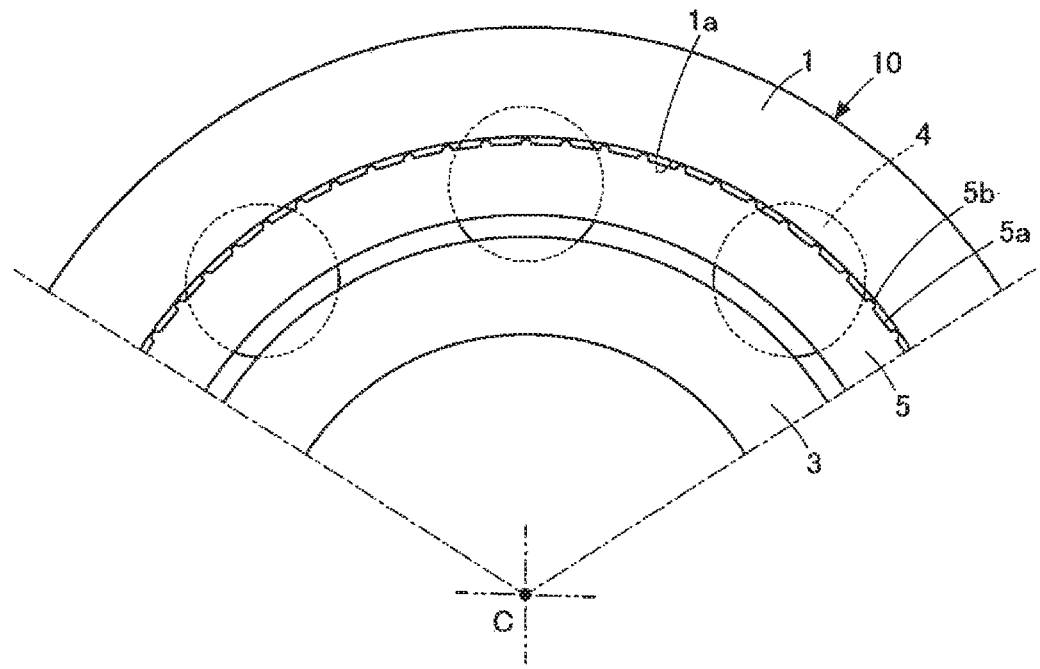
FIG. 1 is a side view of a rolling bearing according to a first embodiment of the present invention.
Figure 2:
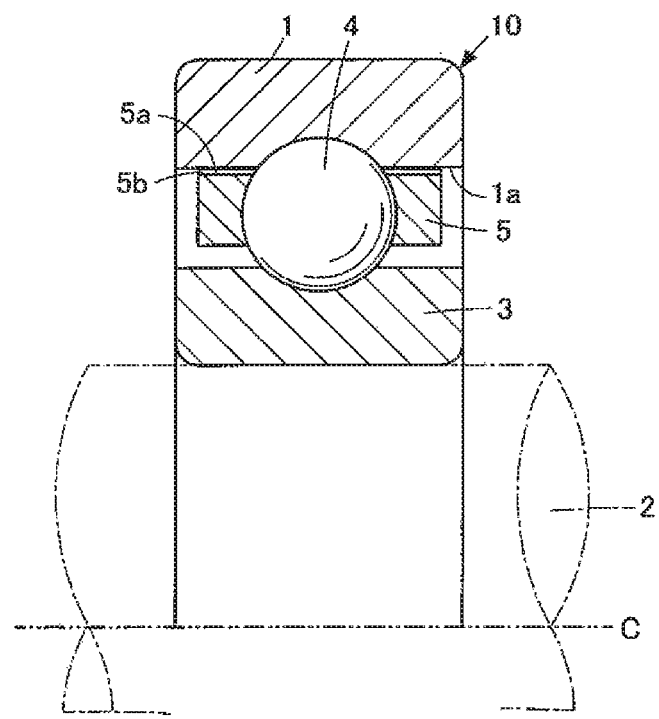
FIG. 2 is a sectional view of the rolling bearing of FIG. 1 according to the first embodiment.

The embodiments of the present invention are described below with reference to the attached drawings.

As illustrated in FIGS. 1 to 5, the rolling bearing 10 according to the first embodiment includes an outer ring 1; an inner ring 3 retaining a rotary shaft 2; rolling, elements 4 comprising balls disposed between the outer ring 1 and the inner ring 3; and a cage 5 rotatably retaining the rolling elements 4. Thus, the rolling bearing 10 of the first embodiment is a ball bearing. As used herein, "axial", "axially", and "axial direction" refer to the direction along the center axis C (see the intersection between one-dot chain lines in FIG. 1; and the two-dot chain line in FIG. 2) of the rolling bearing 10, and "radial", "radially" and "radial direction" refer to a direction orthogonal to the center axis C.

Figure 6:
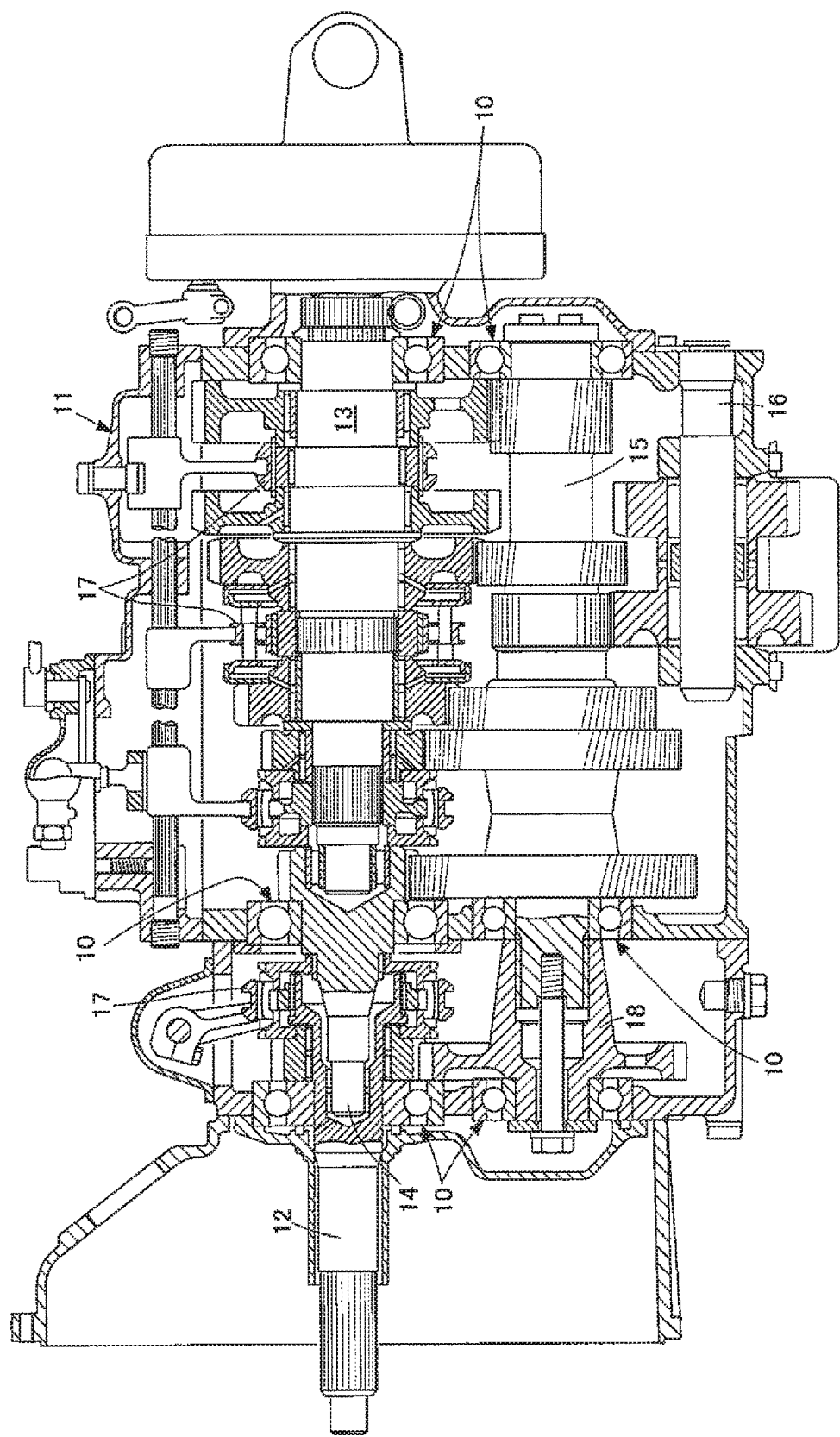
FIG. 6 is a sectional view of a transmission in which rolling bearings according to the first embodiment are mounted.

A plurality of such rolling bearings 10 are mounted in, e.g., an automotive transmission as illustrated FIG. 6 so as to retain shafts that rotate at a high speed. The shown transmission is a manual transmission, and includes, in its housing 11, an input shaft 12, an output shaft 13, and a pilot shaft 14 which are arranged in series; and a countershaft 15 and a reverse shaft 16 which extend parallel to the output shaft 13.

The reverse shaft 16 is configured to engage with the output shaft 13. A large number of gear sets are mounted to the shafts 12 to 16. By operating clutch hubs 17 from the outside of the transmission to shift the clutch hubs 17 to positions where selected gear sets engage, torque is transmitted from the input shaft 12 to the output shaft 13 through a selected torque transmission path including the engaged gear sets.

In the transmission, the rolling bearings 10 support the input shaft 12, the output shaft 13, the pilot shaft 14, and the countershaft 15, which are all rotary shafts; and a gear member 18 mounted to one end of the countershaft 15. The rolling bearings 10 and the rotary shafts 12 to 15 constitute a rolling bearing structure.

Since rotary shafts 2 of a transmission rotate at a high speed, rolling bearings 10 supporting such rotary shafts 2 are used in the high-speed rotation range in which the dmn value, i.e., the product of (i) the average dm (mm) of the inner and outer diameters (namely the pitch circle diameter) of the bearing, and (ii) the number n of revolutions per minute (rpm) of the bearing, is 600,000 or more. For example, in some cases, a rolling bearing 10 supporting such a rotary shaft 2 may be used in the high-speed rotation range in which the dmn value is 1,500,000 or more.

The rolling hearing 10 according to the present invention may be used to support a rotary shaft of a transmission, or to support a rotary shaft 2 other than a rotary shaft of a transmission, such as the shaft of a motor mounted to an electric vehicle or a hybrid vehicle, or a rotary shaft of a machine tool. If the rolling bearing 10 supports the shaft of a motor mounted to an electric vehicle or a hybrid vehicle, or a rotary shaft of a machine tool, the rolling bearing 10 is used in the rotation range in which the dmn value is 600,000 or more, or even more than 1,500,000 under higher speed use conditions The cage 5 of the rolling bearing 10 according to the present invention can come into contact with the inner peripheral surface 1a of the outer ring 1, and is guided by the outer ring 1 while the shaft supported by the bearing is rotating.

The material of the cage 5 is not particularly limited. However, the cage 5 is preferably a machined cage obtained by machining a metal material into a predetermined shape. In this embodiment, the cage 5 is a machined cage formed by machining brass, specifically, obtained by cutting (machining) a cast product of a high strength brass alloy (JIS H5102). Brass is an alloy of copper, as a main component, and zinc. High strength brass alloys (HBs) include HBsC1 and HBsC2, which both comprise (Cu—Zn—Mn—Fe—Al), and HBsC3 and HBsC4, which both comprise (Cu—Zn—Al—Mn—Fe).

By casting brass, or sintering brass powder, it is possible to form a porous cage or a non-porous cage. The porous cage may contain lubricating oil in its interior pores. A material formed by casting high strength brass is high in strength and excellent in self-lubricity, and thus is suitable for use in bearings which rotate at a high speed. The cage 5 may be made of a different metal material, for example, may be a machined cage obtained by cutting (machining) a carbon steel (JIS G4051), or a cage formed of a bearing alloy other than a carbon steel.

Instead of using a metal as mentioned above to form the cage 5, a resin may be used as the main component of the material forming the cage 5. As such a resin, any synthetic resin having the required heat resistance and mechanical strength may be used, but an injection-moldable resin is preferably used in view of production efficiency. For example, the resin forming the cage 5 may be a polyamide (PA) resin, such as polyamide 6 (PA6) resin, polyamide 6-6 (PA66) resin, polyamide 6-10 (PA610) resin, polyamide 6-12 (PA612) resin, polyamide 4-6 (PA46) resin, polyamide 9-T (PA9T) resin, polyamide 6-T (PA6T) resin, or polymetaxylene adipamide (polyamide MXD-6) resin; a polytetrafluoroethylene-perfluoroalkyl vinyl ether copolymer (PFA) resin; a tetrafluoroethylene-hexafluoropropylene copolymer (FEP) resin; or an injection-moldable fluororesin such as an ethylene-tetrafluoroethylene copolymer (ETFE) resin.

Alternatively, the resin forming the cage 5 may be polyethylene (PE) resin, such as low-density polyethylene, high-density polyethylene, or ultrahigh molecular weight polyethylene; polycarbonate (PC) resin; polyacetal (POM) resin: wholly aromatic polyester resin; PPS resin; polyetheretherketone (PEEK) resin; polyamide imide (PAI) resin: polyether imide (PEI) resin: injection-moldable polyimide (PI) resin; or a polymer alloy which is the mixture of two or more of the above-mentioned synthetic resins.

The cage 5 made of a material as mentioned above has an endless annular shape, when seen in the axial direction. Specifically, the cage 5 of the first embodiment is neither of a so-called crown type cage and a separable cage comprising two cage portions combined together. The cage 5 has a plurality of pocket holes 5c in which the respective rolling elements 4 are retained.

The cage 5 of the rolling bearing 10 can come into contact with the inner peripheral surface 1a of the outer ring 1, and is guided by the outer ring 1 while the bearing 10 is operating.

The cage 5 includes, on its outer peripheral surface 5a, a plurality of ridges 5b protruding radially outwardly from the outer peripheral surface 5a, and circumferentially spaced apart from each other. The ridges 5b are arranged so as to be able to come into sliding contact with the inner peripheral surface 1a of the outer ring 1 through lubricating oil R (see FIG. 5).

Figure 3:
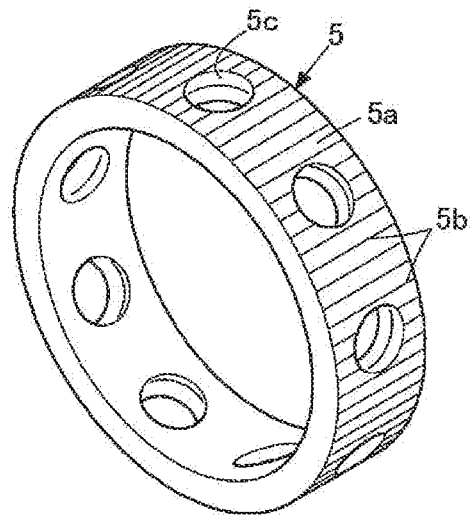
FIG. 3 is a perspective view illustrating the outer appearance of a cage used in the first embodiment.
Figure 4:
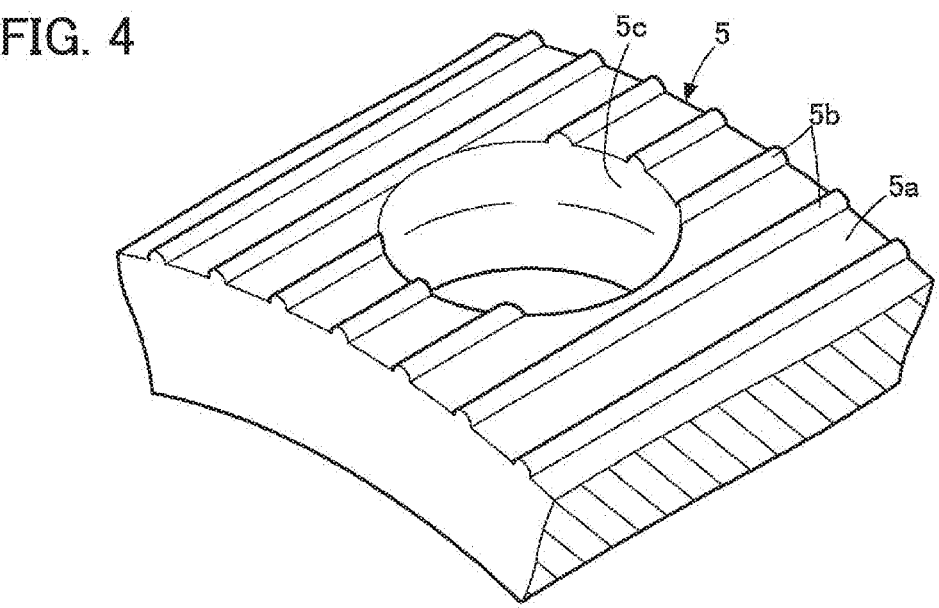
FIG. 4 is an enlarged perspective view illustrating a portion of the cage of FIG. 3, which is used in the first embodiment.
Figure 5:
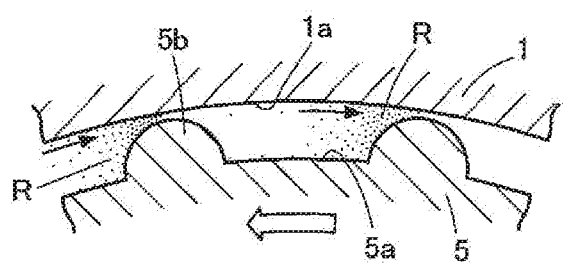
FIG. 5 is an enlarged sectional view illustrating a portion of the rolling bearing of the first embodiment, and how lubricating oil acts.

As illustrated in FIGS. 3 to 5, the ridges 5b extend in the axial direction. Specifically, the ridges 5b axially extend from one axial end of the outer peripheral surface 5a of the cage 5 to the other axial end thereof. Also, the ridges 5b have a semicircular shape, when seen in the axial direction.

In order to uniformly generate the desired "wedge film effect" by a lubricating oil film, thereby stabilizing the rotation of the rolling bearing, the ridges 5b are preferably formed such that the intervals between the adjacent ridges 5b in the circumferential direction of the circular annular cage 5 are equal to each other and as short as possible. Specifically, such intervals are preferably within the range of 0.3 mm or more and 2.6 mm or less.

By disposing the ridges 5b at short circumferential intervals (2.6 mm or less in the embodiment), it is possible to form a continuous oil film along the entire circumference of the outer peripheral surface 5a of the cage 5, with the wedge effect generated without interruption between the ridges 5b and the outer peripheral surface 5a of the cage 5. This enables the rolling bearing to operate with the cage 5 completely separated from, and thus kept out of direct contact with, the outer ring 1 by such an oil film (i.e., with fluid lubrication condition generated therebetween). With fluid lubrication condition generated between the cage and the outer ring, the cage and the outer ring do not substantially become worn, and heat buildup due to sliding between the cage and the outer ring is reduced.

Therefore, the rolling bearing 10 of the present invention is capable of rotating at a high speed that was not attainable with conventional rolling bearings.

Each ridge 5b preferably has a semi-columnar shape as shown in FIG. 4, or has at least a semi-columnar apex portion. This is because such a ridge 5b defines, between the ridge 5b and the inner peripheral surface 1a of the outer ring 1, a wedge-shaped space or gap narrowing toward the apex or circumferential center of the ridge 5b from its circumferential end, and such a wedge-shaped space is effective to collect lubricating oil in a relatively circumferentially narrow area such that the collected lubricating oil, which is a fluid, shows a pressure gradient.

Each ridge 5b may be other than an entirely semi-columnar ridge as shown, or a ridge having a semi-columnar apex portion. For example, each ridge 5b may have the shape of a semi-elliptical, or polygonal (such as triangular or trapezoidal,) prism, or any other known prism shape.

As shown in FIG. 5, when the cage 5 is guided by the outer ring 1, while rotating relative to the outer ring 1, in the direction of the white arrow (counterclockwise direction) in FIG. 5 with the ridges 5b in contact with the inner peripheral surface 1a of the outer ring 1 through lubricating oil R, lubricating oil R is collected near the front surface (in the rotation direction of the cage 5) of each ridge 5b, and is wedged into the wedge-shaped space. As a result, the pressure gradient of the lubricating oil in the wedge-shaped space, which is a fluid, will be such that its pressure increases toward the apex of the ridge 5b, i.e., toward the narrow end of the wedge-shaped space, thereby generating the wedge film effect.

The thus-pressurized lubricating oil R in the respective wedge-shaped spaces acts to widen the gaps between the ridges 5b and the inner peripheral surface 1a of the outer ring 1, thereby keeping the ridges 5b out of contact with the inner peripheral surface 1a of the outer ring 1. Since this action of the pressurized lubricating oil, though the degree thereof varies depending on the rotation speed of the bearing, occurs simultaneously within all of the gaps between the (large number of) ridges 5b and the inner peripheral surface 1a of the outer ring 1, a lubricating oil film is stably formed along substantially the entire circumference of the inner peripheral surface 1a of the outer ring 1 irrespective of the rotation speed of the bearing.

Therefore, it is possible to prevent seizure due to oil film breakage, and reduce wear and vibration of the cage 5 and the outer ring 1. This enables the rolling bearing to stably rotate for a long time with low torque.

The lubricating oil used in the present invention is not particularly limited, and may be, e.g., a lubricating oil used to lubricate rolling bearings capable of rotating at a high speed.

The lubricating oil used in the present invention may be used as a base oil in the form of a lubricating grease, and consequently flows into the gaps between the ridges and the inner peripheral surface of the outer ring.

The above-mentioned lubricating grease comprises at least a base oil and a thickening agent, while the grease is filling the required locations of the rolling bearing. The base oil is of the same type as the lubricating oil, and comprises, e.g., a mineral oil alone, or a mixture of a mineral oil and poly-α-olefin (hereinafter referred to as "PAO") oil. The mineral oil may be one normally used in or as lubricating oil, such as a paraffinic or naphthenic mineral oil. A naphthenic mineral oil such as cyclohexane or cyclopentane is suitable for use in low temperature conditions of an automobile.

Figure 7:
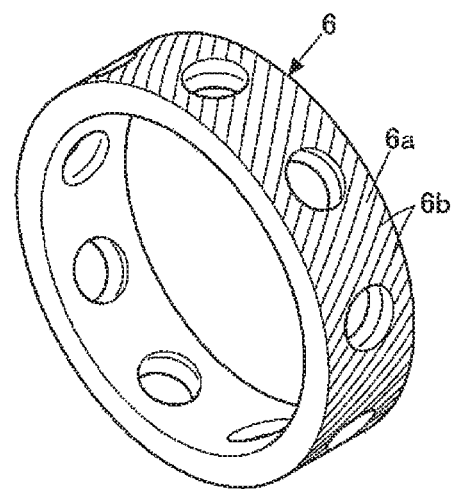
FIG. 7 is a perspective view of a cage used in a second embodiment of the present invention.

FIG. 7 illustrates a cage 6 according to the second embodiment of the present invention, which is exactly the same as the cage 5 of the first embodiment except that, instead of the ridges 5b used in the first embodiment, the cage 6 includes, on its outer peripheral surface 6a, a large number of ridges 6b extending in an oblique direction relative to the circumferential direction, and circumferentially spaced apart from each other.

Figure 8:
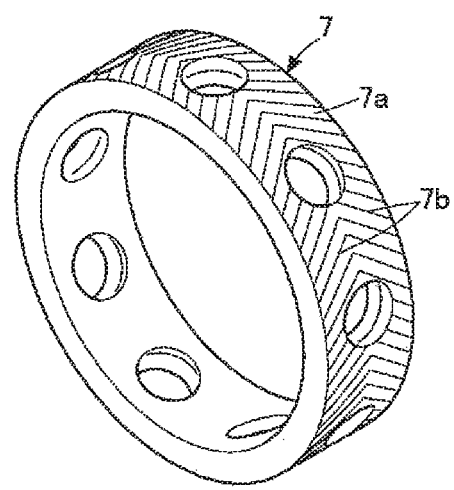
FIG. 8 is a perspective view of a cage used in a third embodiment of the present invention.

FIG. 8 illustrates a cage 7 according to the third embodiment of the present invention, which is exactly the same as the cage 5 of the first embodiment except that, instead of the ridges 5b used in the first embodiment, the cage 7 includes, on its outer peripheral surface 7a, a large number of ridges 7b each extending in two opposite oblique directions relative to the circumferential direction, and circumferentially spaced apart from each other such that the ridges 7b are arranged in a herringbone pattern.

By using the ridges 6b, which extend in a single oblique direction relative to the circumferential direction, or the ridges 7b, which each extend in two opposite oblique directions relative to the circumferential direction, it is possible to discharge lubricating oil in the rolling bearing to the exterior thereof, and thus to reduce the stirring resistance of the lubricating oil, thereby reducing the torque of the rolling bearing.

While the embodiments of the present invention are described with reference to the drawings, the present invention is not limited to the shown embodiments. Various modifications may be made to the shown embodiments within the scope equivalent or corresponding to the scope of the present invention.

DESCRIPTION OF REFERENCE NUMERALS

1: outer ring
1a: inner peripheral surface
2: rotary shaft
3: inner ring
4: rolling element
5, 6, 7: cage
5a, 6a, 7a: outer peripheral surface
5b, 6b, 7b: ridge

The invention claimed is:

1. A rolling bearing comprising:
   an outer ring;
   an inner ring for retaining a rotary shaft;
   rolling elements between the outer ring and the inner ring; and
   a cage rotatably retaining the rolling elements, and configured to be guided by the outer ring,
   wherein the cage has an endless annular shape, when the cage is seen in an axial direction,
   wherein the cage includes, on an outer peripheral surface of the cage, a plurality of ridges protruding outwardly in a radial direction, and spaced apart from each other in a circumferential direction at intervals within the range of 0.3 mm or more and 2.6 mm or less,
   wherein each of the ridges extends either in the axial direction or in an oblique direction or directions relative to the circumferential direction, and
   wherein the ridges are capable of coming into contact with an inner peripheral surface of the outer ring through lubricating oil.

2. The rolling bearing according to claim 1, wherein each of the ridges includes a semi-columnar apex portion, and each ridge has a semicircular shape when viewed in the axial direction.

3. The rolling bearing according to claim 2, wherein the cage comprises a machined cage formed by machining brass.

4. A bearing structure comprising the rolling bearing according to claim 3, and the rotary shaft,
   wherein a dmn value which is a product of a pitch circle diameter dm of the rolling bearing and a number n of revolutions of the rolling bearing is 600,000 or more.

5. A bearing structure comprising the rolling bearing according to claim 2, and the rotary shaft,
   wherein a dmn value which is a product of a pitch circle diameter dm of the rolling bearing and a number n of revolutions of the rolling bearing is 600,000 or more.

6. The rolling bearing according to claim 1, wherein the cage comprises a machined cage formed by machining brass.

7. A bearing structure comprising the rolling bearing according to claim 6, and the rotary shaft,
   wherein a dmn value which is a product of a pitch circle diameter dm of the rolling bearing and a number n of revolutions of the rolling bearing is 600,000 or more.

8. A bearing structure comprising the rolling bearing according to claim 1, and the rotary shaft,
   wherein a dmn value which is a product of a pitch circle diameter dm of the rolling bearing and a number n of revolutions of the rolling bearing is 600,000 or more.

* * * * *